INVENTOR
Kingsley E. Humbert, Jr.

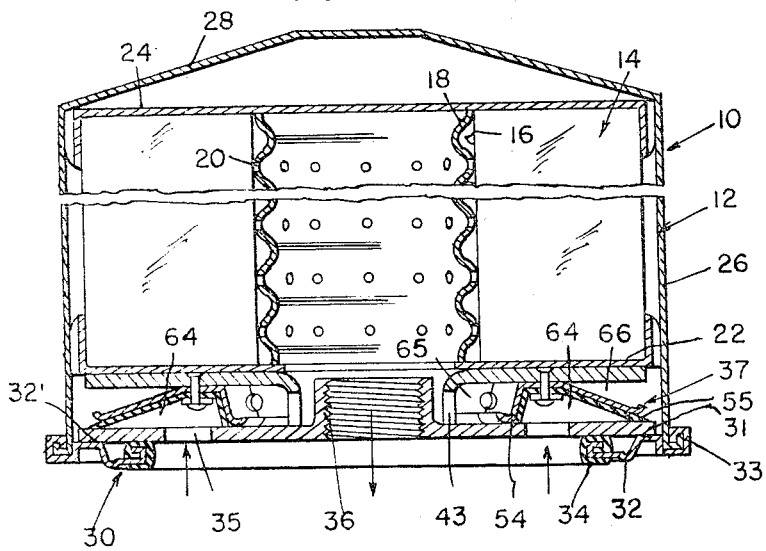

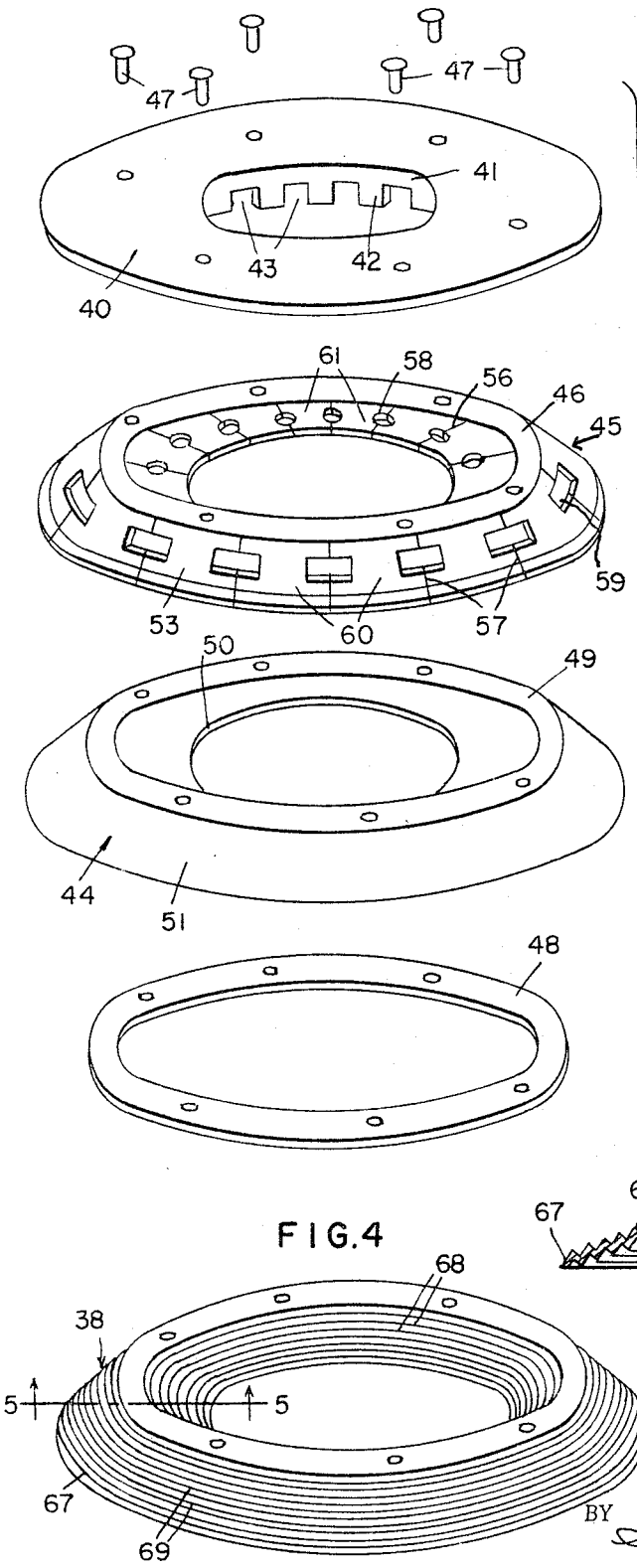

BY *Shoemaker and Mattare*

ATTORNEYS

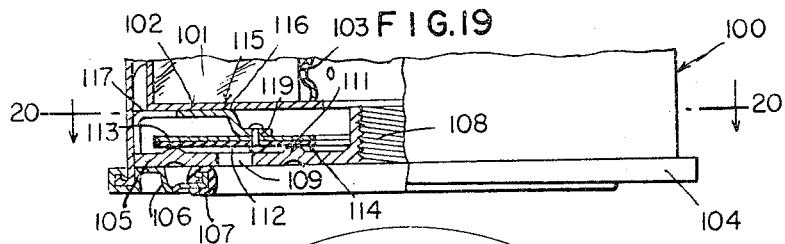
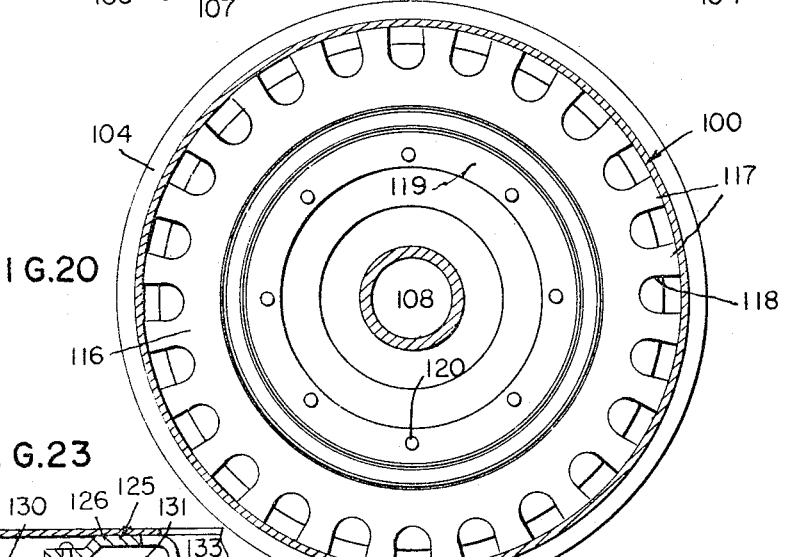
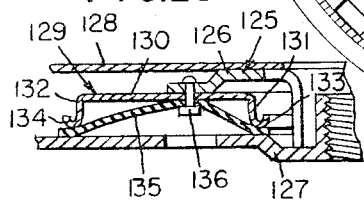
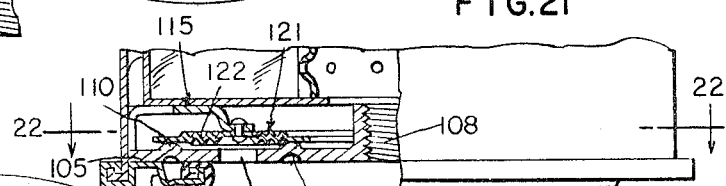
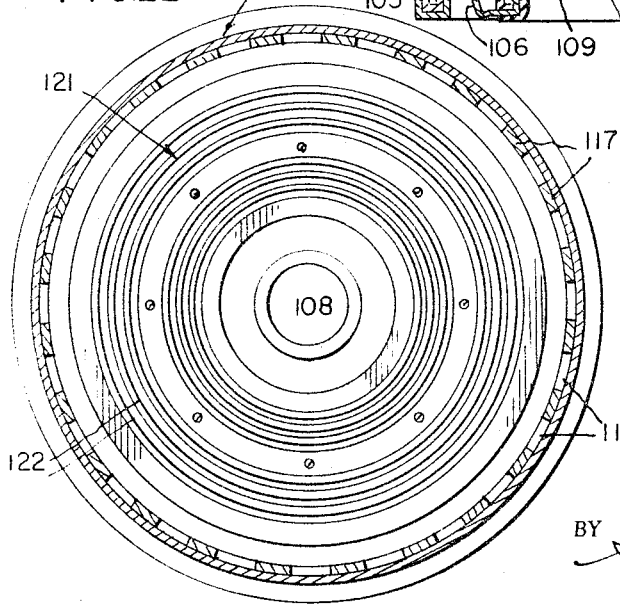
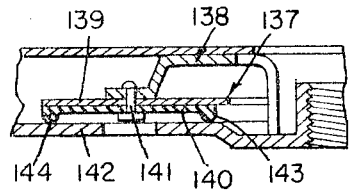
INVENTOR
Kingsley E. Humbert, Jr.

United States Patent Office 3,332,554
Patented July 25, 1967

3,332,554
FILTER UNIT EMPLOYING IN COMBINATION
ONE-WAY AND PRESSURE RELIEF VALVE
Kingsley E. Humbert, Jr., Gastonia, N.C., assignor to
Wix Corporation, Gastonia, N.C., a corporation of
North Carolina
Filed May 4, 1966, Ser. No. 547,461
9 Claims. (Cl. 210—130)

This application is a continuation-in-part of my application Ser. No. 24,383, filed Apr. 25, 1960.

This invention relates broadly to the class of filters and is directed particularly to improvements in a valving means for use therein.

In full flow oil filters as well as many other types of filters for use in fuel lines, air lines and in devices such as hydraulic accumulators, it is desirable to impart to such devices a characteristic whereby flow will be permitted through them in one direction only. At the same time it is desirable that flow continue through such devices even after there has come about a resistance to flow through normal channels to an extent that the device is no longer able to accept such flow. In the case particularly of filters and especially those used in oil lines of motor vehicles, such restriction to flow may be due to the filtering medium becoming clogged by the accumulation of foreign matter therein which has been extracted from the liquid flowing therethrough. In such case it is highly important that the oil flow to the parts being lubricated be maintained even though it has not been cleansed of undesirable foreign matter therein, in order that bearings and other parts may not be completely starved of lubrication.

In the case of hydraulic accumulators it may be desirable to by-pass the accumulator once the same has been fully charged.

It is a particular object of the present invention, in view of the foregoing, to provide a new and novel type of valving means which is particularly well adapted to use in the various situations above stated, more especially in full flow oil filters of the throw-away type which are generally used in motor vehicles.

Another object of the invention is to provide a unitary combination one-way and pressure relief valve which is of a character to be readily installed in a relatively small area within the filter medium housing receptacle of a filter unit between the filter medium and a wall of the receptacle and which is responsive to low pressure of oil directed thereagainst as it flows into the filter structure to pass the oil to the filtering medium so that it may return for discharge back to the oil line and which in another area is responsive to higher pressure such as would be developed in the event of the clogging of the filter medium to cause the oil to by-pass the filter medium and permit the oil to pass directly to the filter unit outlet.

Another object of the invention is to provide a new and novel valve unit which is particularly well suited for use in applications where it may be desired to divide or split a fluid flow, particularly if the flow is to be separated or split into streams moving under conditions of different pressure level. Such feature of the improved valve unit accordingly makes the same particularly desirable for use in air and liquid distribution systems, particularly where machinery is to be powered by the distributed air or liquid.

A still further object of the invention is to provide a new and novel valve unit for use in full flow oil filters and other filters and mechanism of the character described, which is characterized by a resilient structure having radially separated inner and outer wall portions of dissimilar degrees of flexibility adapted for positioning in a spanning association with a fluid supply port thus forming a pressure chamber, one of which wall portions responds to low pressure to be flexed to open position for passing fluid while the other wall portion responds only to a higher pressure of fluid thereagainst to move the same to open position when a condition of back pressure develops against the low pressure side which retards or completely prevents the latter from moving to open position. The resilient structure may take different forms, as for example, it may be in the form of a follow annular frustum of a cone or it may take the form of a susbtantially flat or disc-shaped body, as hereinafter illustrated and described, or other forms, but in all forms there is a pressure chamber over the inlet port or ports embodying the novel concept, without sacrificing the novel features residing in the structures illustrated and described.

The invention contemplates the provision in one illustrated embodiment, of a valve unit which comprises in its simplest form the combination of a pair of spaced plate bodies enclosed by a surrounding wall. Between the plate bodies is positioned the resilient element of the valve which embodies, in the hollow cone form thereof, radially separated leg wall portions, which wall portions have convergent ends which bear against one plate on a line contact and have their opposite ends bearing against the other plate. By this means the flexible element divides the space between the plate bodies into a central fluid area comprising a pressure chamber and outer or lateral fluid areas. The plate having the divergent end edges of the cone thereagainst is provided with a fluid port opening into the central area or pressure chamber and one of the plates adjacent to the inner one of the lateral areas is provided with a fluid outlet. The wall portion of the cone at the outer side thereof responds to low pressure of fluid entering the pressure chamber to be flexed away from the plate with which it has sealing line contact so as to permit the fluid under lower pressure to pass. The development of back pressure against the outer wall portion tending to prevent its flexing away from the opposing plate causes the inner wall portion to respond to a built up or increased fluid pressure in the pressure chamber so as to permit the fluid to pass directly to the outlet port.

Another form of construction by which the inventive concept may be realized comprises the combination of a pair of spaced plate bodies, as hereinbefore described, enclosed by a surrounding wall and the lower one of the plate bodies is provided with a central fluid outflow opening and a number of inflow openings around the central opening and in addition the said plate carries a pair of upstanding concentric annular valve seats between which the inflow openings are located.

The resilient valve element in this second embodiment is in the form of a disc which may be relatively flat or it may be arcuate transversely either in an upward or a downward direction, and it encircles the outlet opening and rests adjacent its inner and outer edges upon the annular valve seats on a line contact, thereby bridging the space between the seats and lying over the inlet openings forming a pressure chamber and means is provided for pressing the annular valve disc onto the seats in such a way that one portion of the valve disc lying radially outwardly of the pressure means has a greater flexibility than another portion lying radially inwardly from the pressing means whereby the outwardly lying portion will open under a relatively light fluid pressure and the inwardly lying portion will open only under a heavier fluid pressure.

The invention will be best understood from a consideration of the following detailed description taken in connection with the accompanying drawings forming part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

FIG. 1 illustrates in longitudinal section an oil filter of the full flow type showing in operative position therein the new and improved combination one-way and pressure relief valve of the present invention, and including one form or one embodiment of the spacer or stiffener element;

FIG. 2 illustrates the valve unit of FIG. 1 with the different parts thereof in exploded or separated relationship;

FIG. 3 is a sectional view on an enlarged scale of the valve unit of the preceding figures;

FIG. 4 is a perspective view on an enlarged scale of a pressed metal cone adapted to function in a similar manner to the resilient metal reinforced diaphragm shown in FIGS. 1 to 3;

FIG. 5 is a partial section on an enlarged scale taken substantially on the line 5—5 of FIG. 4;

FIG. 6 is a view in perspective of another form of spacer or stiffener element;

FIG. 7 is a sectional view corresponding to the lower portion of FIG. 1, but showing the application of the spacer element of FIG. 6;

FIG. 15 is a detail sectional view showing the employment of a resilient valve element which is free of fixed connection with the plate members between which it is set;

FIG. 16 is a detail section illustrating a modified construction of the resilient element wherein the metal portion thereof is completely encased in an elastomer;

FIG. 19 is a view partly in side elevation and partly in vertical section of the lower portion of a filter unit of the general character illustrated in FIG. 1 and showing a second embodiment of the valve unit which takes the form of a composite disc of thin metal and gasket forming material;

FIG. 20 is a transverse section taken substantially on the line 20—20 of FIG. 19;

Figure 8:
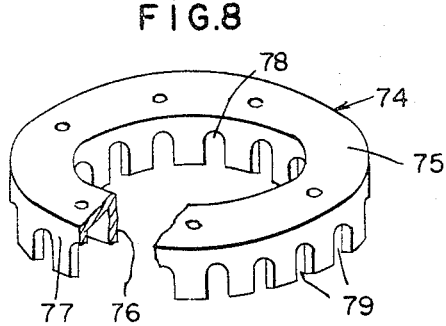
FIG. 8 is a perspective view on a reduced scale of a third type of spacer element which is adapted to be positioned within the center fluid pressure chamber of the valve unit for the support of the flexible valve element.

FIG. 21 corresponds to FIG. 19 but shows another form of the valve unit which comprises a metal disc formed with annular corrugations;

FIG. 22 is a transverse section taken substantially on the line 22—22 of FIG. 21;

FIG. 23 illustrates another embodiment of the valve structure in the form of a substantial inversion or reversal of the structure shown in FIG. 19;

FIG. 24 illustrates another embodiment similar to that shown in FIG. 23.

Referring now more particularly to the drawings, the description will first be directed to the embodiment wherein the numeral 10 generally designates a filter unit of a full flow type in which the present improved valve unit is shown installed. This filter unit comprises the receptacle 12 in which is housed the filter medium which is generally designated 14 and which filtering medium may be of any suitable form or construction.

The form of the filtering medium here illustrated corresponds to that illustrated in application Ser. No. 479,924, now Patent No. 3,054,507, wherein the filtering medium is formed of suitable filter paper and is of fluted annular form and has the central passage 16 therein reinforced by a corrugated metal tube 18, the wall of which is provided with numerous apertures 20 to permit the filtered liquid to pass from the outer side of the medium to the center thereof from which it flows to the filter outlet. The ends of the fluted filter medium are engaged against the inner and outer flanged plates 22 and 24 and these plates have the outer sides of the flanges positioned against the inner surface of the wall 26 of the receptacle and the outer end of the receptacle is closed by the integral wall 28.

The inner end of the filter receptacle has a closure wall which is generally designated 30. This inner end wall of the receptacle is illustrated as comprising two parts 31 and 32 which are welded or otherwise permanently fixed together as indicated at 32'. The part 32 of the inner wall 30 is formed of the thin metal material of which the receptacle wall 26 is formed and comprises an annular member the periphery of which is seamed to the end edge of the wall 26 in the conventional manner as indicated at 33 and the edge of the opening in this annular part 32 of the wall has secured thereon the elastomer sealing ring or collar 34.

The wall part 32 here shown is illustrated and described in detail and claimed in my copending application and accordingly further and more detailed description of the same is not believed to be necessary in this case.

The inner part 31 of the wall 30 is in the form of a relatively heavy base plate which will be referred to as the mating plate with which the hereinafter described valve unit coacts and which in effect forms one element of the valve unit.

The mating plate 31 is provided with an annular series of fluid inlet ports 35, two only of which are here shown, and the central part of the plate 31 has the inwardly extending internally threaded collar 36 by means of which the filter unit is threaded onto a supporting nipple or stud and through which collar the filtered liquid flows from the filter unit back to the oil gallery of the motor vehicle or other machine to which the unit is attached.

As hereinbefore stated, the present improved valve structure is adapted for use in many different associations and while the illustration of the valve unit and the succeeding description thereof are directed to an oil filter, it is to be understood that there is no intention by this to restrict the application of the invention or the use thereof to the motor vehicle filter art.

The valve unit as illustrated in FIG. 1 and in succeeding figures is generally designated 37 and in its broadest aspect embodies an association of parts characterized by a resilient element 38 maintained in operative position with respect to the end wall 30 or more specifically the base plate 31 and a spacer element, supporting and positioning means or supporting and positioning plate generally designated 39 and which may take a number of different forms as hereinafter described.

The spacer 39 in any one of its different forms maintains the resilient element in position between the adjacent plate 22 of the filter medium and the end wall or base plate 31 of the filter unit receptacle.

Referring now particularly to FIGS. 1 to 3, it will be seen that the filter unit embodies a spacer which is in the form of an annular plate 40, the over-all diameter of which is somewhat less than the inside diameter of the receptacle 12 and this plate has a central opening 41 is bordered by the flange 42 in the lower edge of which are formed a number of openings 43.

The diameter of the opening 41 which is defined by the slotted flange 42 is greater than the outside diameter of the threaded collar 36 which extends therethrough and which is concentric with the same when the plate is in position in the filter receptacle as shown in FIG. 1. Also it will be seen upon reference to this figure that the flange 42 rests upon the top or inner side of the base plate 31 of the wall 30 and supports the filter element.

The resilient element 38, in the form here illustrated, may be generally defined substantially as a hollow annular frustrum of a cone, the leg wall portions of which are radially separated and the top or apical portion of which bears against the undeside of the plate 40. The resilient element is in encircling relation with the flange 42 and the top part thereof is in the form of the element fixed to the plate 40.

The element 38 is made up of the substantially frustoconical diaphragm 44 and the substantially frustoconical spring member 45. These are nested together as best seen in FIG. 3, the diaphragm 44 fitting into the similarly shaped spring 45. These two nested members are positioned upon the underside of the plate 40 with the flat top surface 46 of the spring 45 against the plate 40 and securing rivets 47 are passed through the two parts 44 and 45 in the top of the same and through a reinforcing ring 48 which is located against the underside of the flat top portion 49 of the diaphragm 44 through which the rivets 47 pass to secure all of these parts together.

The spring 45 is pressed or stamped from a suitable springy material such as steel, aluminum, spring brass or the like and it functions as will be readily apparent to give positive movement to the inner and outer legs, or leg walls, of the frusto-conical diaphragm 44, such inner and outer legs, or leg walls, of the diaphragm being designated 50 and 51, respectively.

The maximum diameters of the diaphragm and spring are approximately the same and as is shown in FIG. 1, when the resilient element of the valve unit is in operative position between the plate 40 and the inner side of the part 31 of the wall 30, the edges of the legs 50 and 51 of the diaphragm will be pressed upon the surface of the part 31 by the inner and outer resilient legs 52 and 53 respectively of the conical spring to form line sealing contacts at the points 54 and 55, respectively.

In order that the inner and outer legs of the spring 45 may flex freely as required, they are provided with radial slits. Such slits for the inner leg are designated 56 and for the outer leg the slits are designated 57 and the legs are further provided with openings 58 and 59 respectively which span the respective slits 56 and 57 so as to further add to the resilience or flexibility of the portions between the slits. Thus the portions of the legs between the slits 57 provide adjacent pressing fingers 60 which bear upon the outer surface of the outer leg 51 of the diaphragm while the portions of the inner leg of the spring lying between the slits 56 provide resilient fingers 61 which press against the inner leg 50 of the diaphragm.

Preferably the inner and outer legs of the spring 45 have portions around the free edges or peripheries thereof turned or rounded slightly as indicated respectively at 62 and 63 so that no sharp edge of the spring metal will bear against the underlying portion of the elastomer diaphragm.

As previously stated, the resilient element embodying the diaphgram 44 and the spring 45 is secured to the underside of the spacer plate 40 concentrically with the slotted flange 42, and the dimensions of the resilient element are such that when it is so attached to the plate 40 and the latter is located in operative position against the plate 22, the legs of the frusto-conical element will be in spanning or straddling relation with the inflow apertures 35. Thus the resilient element of the valve unit will divide the space between the plate 40 and the part 31 of the end walls 30 into a central fluid receiving area or pressure chamber 64 and lateral or radially spaced inner and outer chambers or areas 65 and 66.

It will also be seen that the outer leg portions of the resilient element made up of the legs 51 and 53 of the diaphragm and spring respectively, are much longer than the corresponding inner legs of the diaphragm and spring and are disposed at a flatter angle than the corresponding inner legs and accordingly they are more resilient and respond to a lighter or lower pressure of fluid within the pressure chamber thereagainst from the underside or from the pressure chamber area 64, than do the inner leg portions of the two parts of the element. It will accordingly be apparent from the foregoing that when the valve unit is installed in the manner illustrated in FIG. 1 in a filter structure, the fluid to be filtered will be introduced into the pressure chamber or center area 64 by the ports 35 and the outer leg portion of the resilient element will first be responsive to the fluid pressure so as to permit the fluid to flow laterally outwardly by raising the resilient element legs from the line sealing contact 55. Thus the fluid will pass into the outer or low pressure chamber 66 and flow upwardly as indicated by the arrows to pass radially inwardly through the filter medium to the center thereof from which it will return to its source by way of the outlet 36.

In the event of the blockage of the fluid flow into the outer area or chamber 66, as for example, by the choking of the filter material, the higher pressure which will then be built up in the pressure chamber 64 will be sufficient for effecting the separation of the inner leg portion of the resilient element from the line sealing contact 54, thus permitting the fluid to by-pass the filter and flow directly through the openings 43 and to the outlet 36.

It will thus be seen that the legs of valve member are so arranged that when they are in contact with the base plate 31 they engage that plate on a line contact and effect a seal against the plate when no pressure is in the pressure chamber, however, it will be seen that when the edge of the flange 42 is pressed against the inner side of the part 31 it will be apparent that the sharply inclined inner leg portion and the more flatly inclined outer leg portion of the resilient element will be pressed firmly against the inner side of the part 31 and thus will be held under load so that some degree of force or pressure is required to separate them from the part 31 by the fluid introduced into the pressure chamber 64.

The part 31 of the assemblage thus functions as a valve mating plate with which the legs of the resilient element cooperate.

FIGS. 4 and 5 illustrate a slightly different embodiment of the resilient element of the valve. Here such resilient element identified by the generic reference numeral 38, consists of a single part only and may be formed of sheet metal material 67 of a suitable resilient character which can be molded or stamped with or in concentric rings 68 and 69 in the respective inner and outer leg portions of the cone. This would give a bellows effect to the cone which will force the peripheral edges into sealing engagement with the opposing surface of the mating plate at the approximate location designated 54 and 55 in FIG. 1. This resilient element stamped with the inner and outer concentric rings whereby the bellows effect would be obtained, would, of course, be secured in position against a spacer plate similar to the plate 40 by means of the rivets 47 and the ring 48 or it might be secured to any one of the other hereinafter described spacers and it would function in the same manner as the elastic diaphragm and spring assembly with respect to the pressure chamber 64 and the line contact of the ends of the inner and outer legs with the base plate 31.

FIGS. 6 and 7 show another form of spacer which might be employed in association with the spring and diaphragm assembly or the resilient element shown in FIGS. 4 and 5. Here the spacer comprises the plate 70 having a central aperture 71 therethrough and having the flange 72 around the outside edge of the plate, the flange having fluid passing openings 73 therein as shown. The plate 70 is shown in operative position against the part 31 of the end wall structure 30, the free edge of the flange 72 resting against the part 31 and the top side of the plate 70 having the filter medium attached plate 22 bearing thereon. Thus the plate 70 provides the desired spacing for the placement of the resilient element in position and in this arrangement when the resilient element yields around the outer side thereof to separate the low pressure responsive leg from the part 31, under the force of fluid introduced into the pressure chamber 64, the fluid will flow laterally through the openings 73 and to and through the filter medium as hereinbefore described. Likewise, when back pressure is imposed upon the outer side of the outer low pressure yielding leg of the resilient element so that the latter cannot open, the inner or high pressure responsive leg will be moved by the increased fluid pressure in the pressure chamber 64 to permit the fluid to pass directly to the outlet at the center of the part 31.

Figure 9:
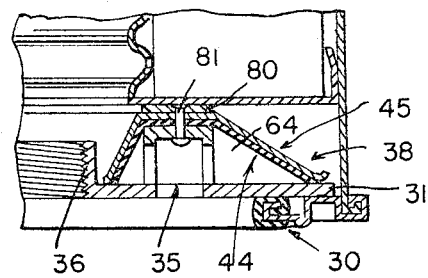
FIG. 9 is a sectional detail illustrating the application of the support of FIG. 8.

FIGS. 8 and 9 illustrate another form of spacer for maintaining the resilient element 38 in operative position. In these figures the spacer is generally designated 74 and comprises an annular plate 75 of relatively narrow width having the inner and outer edge flanges 76 and 77 respectively which in turn are respectively provided with openings in the form of slots, holes or the like designated respectively by the numerals 78 and 79. Thus it will be seen that this spacer is in effect an annular channel member which, when it is placed in position upon the mating part 31, which forms a part of the wall 30, lies over the inflow opening or openings 35 of the valve mating plate. The anular plate 75 is positioned against the inner side of the diaphragm part 44 of the resilient element 38 while upon the top of the spring part 45 of the resilient element a flat ring 80 is placed and rivets 81 are passed through the several related parts to secure them in position in the manner shown. Here it will be seen that the spacer is located within the pressure chamber in which the fluid is received, which is the same as that hereinbefore referred to and is designated 64, and when the inner and outer legs of the resilient cone element are raised from the surface of the valve mating plate 31 by the pressures hereinbefore described, the fluid will flow either outwardly to pass through the filter material or if this is not possible it will then flow inwardly to by-pass the filter material and escape by means of the central outlet 36.

Figure 10:
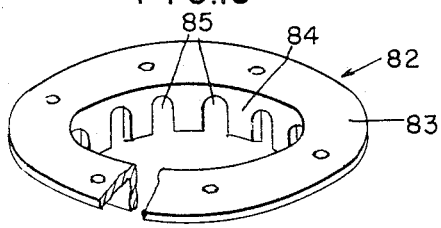
FIG. 10 is a view in perspective on a reduced scale of a fourth embodiment of the spacer.
Figure 11:
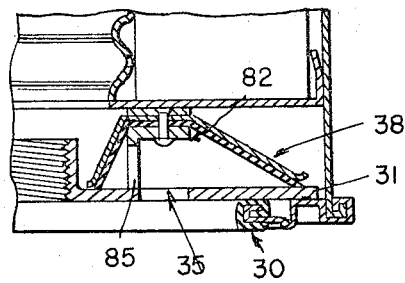
FIG. 11 is a fragmentary detail in section illustrating the application of the spacer of FIG. 10.

FIGS. 10 and 11 illustrate still another form of spacer which is in effect substantially the same as the spacer 74 with the exception that one flange of the channel is eliminated. This spacer is generally designated 82 and comprises the narrow annular plate 83 bordered on one edge, here shown as the inner edge, by the flange 84 which is provided with a plurality of openings 85. FIG. 11 illustrates the manner in which the spacer 82 is attached to the under or inner side of the conical resilient element which is here generally designated 38 and is of the same construction as that previously described in connection with FIG. 1 and succeeding figures. Here the spacer 82 is shown as having the slotted or apertured flange 84 resting upon the valve mating plate 31 at the inner side of the inlet opening, but as will be readily apparent, the single flange for this spacer might be at the opposite edge in which case it would be located upon the outer side of the opening 35.

Figure 12:
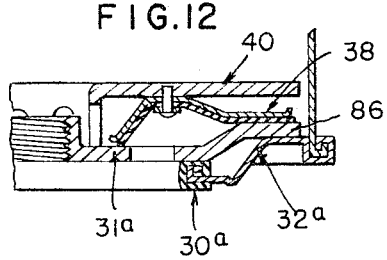
FIG. 12 is a sectional detail illustrating a modified form of mating plate against which the valve element bears and wherein the outer periphery of such plate is inwardly offset.
Figure 13:
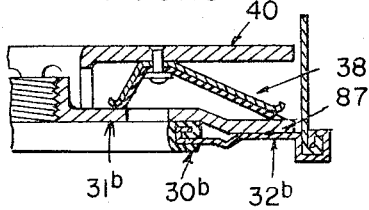
FIG. 13 is a sectional view corresponding to FIG. 12, but illustrating the peripheral portion of the mating plate outwardly offset with respect to the resilient valve element.

FIGS. 12 and 13 show different forms of valve mating plate hereinbefore referred to and which forms a part of the inner end wall of the filter receptacle. These figures are designed to show that such mating plate does not necessarily have to be flat like the plates 40 and 70 but may have an outer portion thereof offset if such offsetting is found to be desirable as is sometimes required to meet certain space requirements or to change the load characteristics of the valve, more particularly the resilient element thereof.

In FIG. 12 the valve mating plate is generally designated 31a and in this construction this plate, which like the plate 31 forms an integral part of the end wall of the receptacle, which end wall is here designated 30a, has the peripheral portion 86 inwardly offset and in parallel relation with the spacer plate as shown and the wall part 32a is accordingly modified as shown, whereby to facilitate the joining of the two parts 31a and 32a together.

The spacer here illustrated is of the same construction as that shown in FIGS. 1 to 3 and accordingly it is designated by the same reference character 40, and the resilient element of the valve is also the same as hereinbefore described in FIGS. 1 to 3 and succeeding figures and is accordingly designated 38.

In FIG. 13 the valve mating plate is generally designated 31b while the end wall structure as a whole is here designated 30b and the part thereof joined to the mating plate is generally designated 32b. In this construction the outer peripheral portion of the mating plate is offset outwardly or in an axial direction away from the spacer as indicated at 87.

As in the preceding FIG. 12, the other parts, namely, the spacer and the resilient element, are of the construction already described and accordingly the same reference numerals are applied thereto, the spacer being designated 40 and the resilient element being designated 38.

Figure 14:
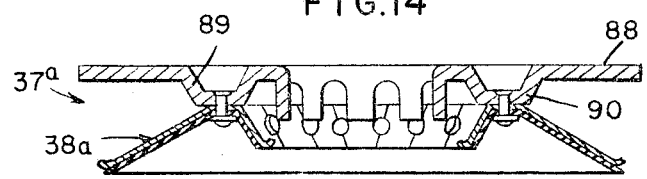
FIG. 14 is a sectional view through the flexible valve element and the spacer plate showing a modified construction of the latter.

FIG. 14 illustrates another embodiment of the valve element which is generally designated 37a, wherein the spacer comprises a modified form of the plate 40 and is here generally designated 88. This modified spacer plate 88 is provided with an annular recess, as indicated at 89, thus forming on its underside a downwardly or axially outwardly projecting rib 90 to which the resilient valve element 38a is secured. This resilient element 38a is of the same form or construction as shown and described in FIGS. 1 to 3 and succeeding figures and, therefore, the general reference character for the same is believed to be sufficient as it will be understood that the elements thereof are the same as hereinbefore set forth. This recessed spacer, by reason of the annular recess 89 therein, provides a smooth sealing surface for the filter medium on the low pressure side of the spacer which also functions as a support for the filter medium as illustrated in preceding figures.

FIG. 15 illustrates how the combination one-way and pressure relief action of the frusto-conical valve element may be accomplished without securing the resilient element to the spacer plate as hereinbefore described and as illustrated in the preceding figures. Here the resilient element is generally designated 38b and it may consist of the inner conical diaphragm 44a and the outer conical spring 45a, these being of similar construction to the parts 44 and 45. The element when installed between the spacer plate 40 and the mating plate part 31, has the apex which is formed where the inner and outer legs join and which is designated 46a, merely bearing or fulcruming against the underside of the spacer plate 40. With the exception that the apex 46a is a line contact rather than flat surface contact, such as the part 46 of the spring 45, and is free of a fixed connection with the plate 40, the construction of the resilient element is the same as described in connection with FIGS. 1 to 3. With this construction the opening pressures on the inner and outer legs of the valve element will be much closer than will be the case when the valve element is rigidly fastened to the spacer plate.

In addition to the forming of the diaphragm controlling spring 45 to overlie the diaphragm, the frusto-conical spring 45 may be encased in a resilient jacket as illustrated in FIG. 16. Here the spring member corresponding to that shown in FIG. 2 and generally designated 45, is designated 45b and the numeral 44b generally designates an elastomer sheath or covering over the spring 45b. Thus the spring metal will be entirely encased or protected from contact with the fluid and the elastic peripheral portions of the inner and outer legs of the cone provide the desired line sealing contact with the surface of the valve mating plate and since the spring 45b has the inner and outer legs thereof split or sectioned in the same manner as is shown in FIG. 2, obviously the legs of the resilient element can readily flex under the pressures applied against the inner sides thereof.

Figures 17, 18:
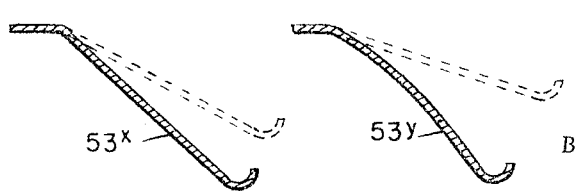
FIG. 17 illustrates diagrammatically the action of the outer leg of the resilient cone when the leg is made straight throughout and as it is flexed to opening position.
FIG. 18 illustrates a curved form of the outer spring leg of the cone and showing the manner in which it would straighten out on being flexed to open position.

The resilient element in the form or embodiment thereof having the diaphragm with the spring member 38 thereover, may be provided with the spring leg walls, particularly the outer leg wall, either straight from the top to the bottom edges thereof, in the manner illustrated particularly in the detail view forming FIG. 17, or the inner and outer leg walls may be slightly bowed outwardly and for this latter form FIG. 18 is illustrative, where it shows the outer leg wall formed in this manner. Where the leg wall 53, for example, is flat, as in FIG. 17, which wall in this figure is designated 53x, when the fluid under pressure enters the central pressure chamber by way of the ports 35, the leg wall will flex outwardly in approximately the manner shown in dotted lines in FIG. 17, that is, maintaining its substantially flat form.

In the case of forming the leg wall 53 in outwardly bowed condition as indicated at 53y in FIG. 18, when the spring and the resilient diaphragm are flexed or forced to rise by the pressure of fluid on the underside thereof the leg wall will more or less flatten out as shown in dotted outline in this FIG. 18.

It is also preferred that the free peripheries of the leg walls 52 and 53 be slightly curved as is shown most clearly in FIGS. 17 and 18, so that possibility of the spring metal cutting the underlying diaphragm will be avoided.

From the foregoing it will be seen that the valve of the present invention can function, as hereinbefore stated, as a dual one-way and pressure relief valve. For example, referring to FIG. 1 particularly, the valve is seen assembled against the valve mating plate 31, which here is shown as forming an integral part of the wall 30. The valve can be so formed or shaped that a very light pressure is required to open the outlying or outside sealing face or line sealing contact point 55 so that fluid, either in the form of a gas or liquid, can pass radially outwardly with respect to the valve unit as indicated by the arrows from the pressure chamber 64 to the inlet side of the filter or the outer or low pressure chamber 66. Once the resistance across the filter reaches a point where the full flow of the fluid can no longer be accommodated, the pressure in the pressure chamber 64 will rise and this will effect the lifting of the inner leg wall of the valve unit separating the lower periphery of this leg wall from the valve mating plate 31 at the line contact 54. This will allow the fluid to then pass into the exhaust or inner chamber 65 from which it will flow directly to and out through the center portion of the mating plate to exhaust from the filter unit, by-passing, of course, the filtering medium.

Many possibilities are available in the construction of this valve unit whereby to adjust the pressures to whatever degrees might be desired. The spring metal part of the valve unit, exemplified by the resilient element 38, can be so shaped as to cause either the outer leg wall thereof or the inner leg wall to assume a much heavier load than its opposite member. The surface with which the resilient sealing part of the unit, such as the diaphragm 44 or the metallic sealing member 67, makes contact, can be shaped so as to vary the load on the individual resilient part. Also the metal of the resilient element 38, for example, may be removed in portions of the inner and outer leg walls thereof in the manner illustrated by the openings 58 and 59 in FIG. 2 in order to change the spring characteristics of the finger portions 60 and 61. Also the thickness of the metallic material may be varied as may be desired, for the accomplishment of the desired results.

It should be desired that the opening pressures be reasonably close together, the frusto-conical part of the valve unit may be designed to function without the use of a retaining ring, such as the ring 48, or without having it fixed at the convergent portions of the inner and outer leg walls. Such an arrangement is illustrated in FIG. 15. With this arrangement, area differences alone will determine the opening pressures at the individual sealing points, faces or lines.

As hereinbefore stated, other structural forms of the valve unit may be employed by which the objects of the invention may be realized, and such additional forms are illustrated in FIGS. 19 to 22.

In FIG. 19 the numeral 100 generally designates the receptacle in which the filter unit 101 is housed. This unit is generally of the same construction as the hereinbefore described unit 14, having a bottom plate 102 and a central foraminous tube 103.

The bottom wall for the filter structure is generally designated 104 and as in the previous construction, consists essentially of the filter support plate and valve mating plate 105 and the thin metal part 106 which is of annular form and is seamed to the outer wall of the receptacle and carries the gasket 107. The valve mating plate 105 which forms one of the elements of the bottom wall has the central flanged opening 108, which flange is interiorly threaded, and a number of surrounding openings 109. The opening 108 functions as the fluid outlet and the openings 109 provide the fluid inlets.

The valve mating plate 105 carries a pair of concentric annular valve seats which encircle the flanged opening 108 and are designated 110 and 111. These annular seats are here shown as upstanding ribs formed integral with or pressed from the plate 105 but they may take any other suitable form which will serve the desired purpose and the fluid inlet openings lie between the seats, as shown.

The valve element in this embodiment is generally designated 112 and is shown as being in two parts or two laminations, the upper part or lamination comprising a flat annulus of thin metal 113 and the lower part of laminations consisting of a surfacing of gasket material 114 of suitable character. The unit 112 encircles the flanged opening 108 and is of a width to span the space between the inner and outer seats so that it will rest upon the outer seat adjacent to its outer edge on a line contact and the valve adjacent to its inner edge will rest upon the inner seat on a line contact, and thus be spaced from the surface of plate 105 where it will overlie the openings 109 and there will be provided a pressure chamber corresponding to the herein described pressure chamber 64.

The element 112 is maintained in position by the spacer or stiffener element 115 which embodies the annular plate 116 having in the form here shown the downturned outer edge flange 117 which essentially corresponds to the flange 72 of the previously described spacer or stiffener element 70 and this flange and a portion of the plate 116 is provided with a plurality of recesses or notches 118. As shown, the stiffener 115 rests at the edge of the flange portion 117 upon the outer part of the support plate and valve mating 105 and overlies the valve element 112 and the inner portion of the annular plate 116 has a downwardly offset edge flange 119 which is secured by rivets 120 or in any other suitable manner to the top of the metal portion 113 of the valve element.

The top of the stiffener element 115 provides a surface upon which the bottom part of the filter unit, such as the bottom plate 102 thereof, may rest. Thus the filter unit is supported actually by the valve mating plate 105 through the medium of the interposed stiffener 115. Upon consideration of the hereinbefore described forms of stiffener plates wtih the valve element 112 there may be employed a stiffener plate in which the flange is upon the inner edge to rest on the plate 105 between the annular valve seat 111 and the flanged opening 108, in which case the outer edge portion of the stiffener plate would be offset and fixed to the top of the valve element.

By increasing the offsets in the stiffener element and the offsets forming the annular seats 110 and 111 in the filter support plate, the flexible valve element could be, when in fully closed position, concave upward or by reducing the offsets, the flexible valve element would become or could be made concave downward or substantially frusto-conical.

It will also be apparent that the relative flexibility of the portions of the valve element lying inwardly and outwardly of the circular line where the flange 119 is secured, may be adjusted or varied according to whether the flange 119 is positioned exactly midway between the inner and outer edges of the valve element or to one side of such center. In the illustration here presented it will be seen that the flange 119 is closer to the inner edge of the valve element than to the outer edge and accordingly the shorter portion between the flange 119 and the inner edge of the element will be somewhat less flexible than the portion between this flange and the outer edge of the element. Therefore, it will be apparent that a lower pressure of fluid entering by way of the openings 109 will be required to unseat this wider and more flexible portion of the element than will be required to unseat the inner portion and, therefore, the desired fluid flow in one direction will be permitted radially outwardly to and through the filter element for return by way of the central opening 108, but upon clogging of the filter element or if for any other reason the upstream flow of fluid is checked, which would create a back pressure to prevent the outer portion of the valve element from unseating, then the higher pressure which would develop under the valve element would result in unseating the less flexible inner portion and the fluid would pass directly to the outlet, bypassing the filter element.

While the valve element 112 has been illustrated and described as being in two parts or pieces, it may also be formed of a suitable thin flexible material of flat form or such flexible material may be corrugated, as illustrated in FIGS. 21 and 22.

In these latter figures the valve element is generally designated 121 and as shown it consists of a single thickness of material such as a suitable thin metal which is pressed or shaped to have corrugations or bellows rings 122 of concentric annular form therein. This single bellows form or corrugated form would function in the same manner as the element 112 and, therefore, it is illustrated as resting adjacent its inner and outer edges upon similarly formed annular seats in a line contact and since the structure with which this form of the valve element cooperates is the same as previously described, the same reference characters are employed in these FIGS. 21 and 22 to designate the like parts shown in the preceding two figures.

FIGS. 23 and 24 illustrate two further embodiments of the valve structure corresponding to the structures shown in FIGS. 19 and 21 wherein the peripheral portions of the valve disc seat upon the end wall plate of the bottom wall of the filter structure with the bead forming means, forming a part of the metal element of the valve.

Referring particularly to FIG. 23, the stiffener element illustrated corresponds in construction to that shown in FIG. 1 and is generally designated 125. This stiffener element has the horizontal circular top portion 126 with the inner edge carrying the slotted supporting flange which rests upon the valve mating plate 127 which forms a part of the can inner end wall.

The valve element which is secured between the inner end wall 128 of the filter cartridge and the valve mating plate 127, is generally designated 129. This valve element comprises the thin spring metal annular disc 130 having the inner and outer downturned flanges 131 and 132 respectively, the edges of which flanges are rounded to form beads 133 and 134.

Underlying the thin metal disc 130 is the annular elastomer sealing disc 135. This annular sealing disc is bowed up into the area defined by the flanges 131 and 132 and is secured to the disc 130 by a rivet or bolt 136, which rivet or bolt passes also through the outer peripheral portion of the stiffener 125.

The inner and outer peripheral portions of the sealing annulus 135 are interposed respectively between the inner and outer beads 133 and 134 and the valve mating plate 127. Thus when the filter cartridge is in position it will be understood that it will rest upon and be supported by the stiffener plate 125 and the yieldable metal spring disc 130 will press the peripheral portions of the sealing annulus 135 onto the surface of the valve mating plate 127 on a line contact.

FIG. 24 illustrates another construction or embodiment of the valve unit, generally corresponding to the construction shown in FIG. 23. In FIG. 24, the valve unit is generally designated 137 and the stiffener plate to which it is attached is generally designated 138 and is shown to be of the same general design as that shown in FIG. 23. The valve unit here comprises a flat resilient metal spring annulus or disc 139 against the underside of which is positioned the elastomer sealing disc 140 and this disc and the spring disc are secured to the outer peripheral portion of the stiffener plate by the rivet or bolt 141.

In this last valve structure, the sealing bead between the peripheral portions of the elastomer disc 140 and the opposing surface of the valve mating plate 142 constitute inner and outer annular ribs 143 and 144 formed integrally with the disc 140. Thus, it will be seen that in this construction and in the construction shown in FIG. 23, the elastomer sealing disc element which has peripheral portions bearing or seating on a line contact upon underlying portions of the valve mating plate of the filter cartridge receptacle is spaced from the inner surface of the valve mating plate of the receptacle and extends across the fluid inlet apertures of the plate forming a pressure chamber similar to the pressure chamber 64 previously described. Also, it will be apparent that the location of the attaching rivet or bolt between the stiffener plate and the valve unit will determine the degree of flexibility of the portions of the valve element on the inner and outer sides of the fluid inlet openings and by moving this attachment radially outwardly, for example, the flexibility of the inner and outer portions of the valve element will be brought more nearly into agreement, whereas by moving the connection between the stiffener plate and the valve unit radially inwardly with respect to the spring metal disc 130 or 139, the outer peripheral portion of the valve unit will be made more flexible or will more readily yield than the portion thereof lying radially inwardly of the attaching rivet 136 or 141.

Thus, all of the valve elements engage the valve mating plates 31, 105, 127 and 142 on spaced apart line contacts. The inner legs of all of the forms of the valves engaging the mating plates at the ends of the legs on a line contact while the ends of the outer legs of all of the valves engage the mating plates on a line contact thus effecting a positive seal against anti-drain back from the filter casing to thus maintain a supply of oil in the casing when the engine is not running.

The pressure chamber formed by the shape of the valve with relation to the mating plate will maintain the fluid therein at a predetermined pressure while the filter is working. Also by using the pressure chamber the number of inlet openings in the mating plate may be reduced as a full flow of fluid to be filtered may be maintained in the pressure chamber and at the pressure set for the opening of that valve part allowing the fluid to pass through the filter. The area of the pressure chamber controls the pressure therein along with the degree of flexibility of the legs of the valve. In this manner the flexibility of the legs of the valve in proportion to the area of the pressure chamber may be so calibrated that the valve will open at a predetermined pressure. Also both legs of the valve may be so calibrated that they will both open at a substantially similar predetermined pressure especially when the fluid is cold so as to allow some of the fluid to by-pass the filter in order not to starve the moving parts of the motor during warm-up. After warm-up, however, the pressure will drop slightly allowing the by-pass valve to close so that all of the fluid will pass through the filter.

Inasmuch as various changes may be made in the form, location and relative arrangement of the several parts without departing from the essential characteristics of the invention, it will be understood that the invention is not to be limited except by the scope of the appended claims.

I claim:

1. A screw on throw-away filter comprising a casing, the casing having one end closed, a filter media within the casing, the casing having the other end open, closure means for the open end comprising a rigid plate and a closure wall seamed to the casing, the rigid plate being within the casing and held therein by the closure wall, the rigid plate having inlet ports and an outlet port therein, attaching means concentric with the outlet port to attach the filter to a structure, a combined anti-drainback and pressure relief valve freely positioned within the casing between the filter media and the rigid plate and being unconnected with the structure comprising the other end of the casing, a substantially rigid valve supporting and positioning plate within the casing freely positioned between the other end of the casing and the filter media, the valve supporting plate having at least one flange thereon engaging the rigid plate and spacing the valve supporting plate from the rigid plate, the flange having flow openings therein allowing passage of fluid into the casing, the valve supporting plate being unconnected to the structure comprising the other end of the casing, the combined valve being connected only to the valve supporting plate and being positioned between the supporting plate and the rigid plate, the combined valve having a body portion and end portions extending from each side of the body portion, the end portions engaging the rigid plate on both sides of the inlet ports on a line contact, the body portion being supported above and spaced from the area surrounding the inlet ports of the rigid plate and forming with the adjacent part of the rigid plate a pressure chamber over and around the inlet ports, the pressure chamber receiving the fluid flowing through the inlet ports, one end portion of the valve being of a varying flexibility from the other end portion so that the pressure of the fluid in the pressure chamber will act against one end portion of the valve to cause that end portion to move out of the line contact engagement with the rigid plate and allow flow into the casing through the filter media and through the outlet port and upon a higher pressure being developed in the casing and pressure chamber, such higher pressure will act against the other end portion of the valve to cause the other end portion to move out of the line contact engagement with the rigid plate and allow flow of the fluid to by-pass the filter media and flow directly through the outlet port.

2. A filter as set forth in claim 1, wherein the valve is of a general frusto-conical shape having a body portion and leg portions comprising the end portions, the valve straddling the end wall with the ends of the leg portions engaging the end wall on opposite sides of the inflow openings and the pressure chamber is formed within the frusto-conical shape.

3. A filter as set forth in claim 2, wherein the valve is composed of a backing member of flexible material and having a facing of a composition material.

4. A filter as set forth in claim 2, wherein the valve is composed of a corrugated flexible material.

5. A filter as set forth in claim 2, wherein the valve is composed of a body of flexible material encased in a composition material.

6. A filter as set forth in claim 1, wherein the valve is substantially ring shaped having a body portion and inner and outer circumferential portions comprising the end portions, the circumferential portions engaging the end wall, the body portion being spaced from the end wall and forming with the end wall the pressure chamber over and around the inflow openings.

7. A filter as set forth in claim 6, wherein the valve is composed of a backing member of flexible material and a facing of a composition material.

8. A filter as set forth in claim 6, wherein the valve is composed of a corrugated flexible material.

9. A filter as set forth in claim 6, wherein the valve is of ring shape with the circumferential portions being flanges extending downwardly from the body portion and having connected thereto a ring of a composition material having inner and outer circumferential portions underlying the circumferential portions of the ring body.

References Cited

UNITED STATES PATENTS 3,083,832   4/1963   Hathaway et al. _____ 210—130

SAMIH N. ZAHARNA, *Primary Examiner*.